I. T. Payne,
Auger.
No. 3,879. Reissued Mar. 15. 1870.
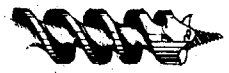
Witnesses:
Victor Hagmann
M W Hart
Inventor:
I. T. Payne
per Munn & Co
Attorneys.

United States Patent Office.

IRA T. PAYNE, OF CHESTER, CONNECTICUT.

*Letters Patent No.* 75,454, *dated March* 10, 1868; *antedated February* 28, 1868; *reissue No.* 3,879, *dated March* 15, 1870.

IMPROVEMENT IN AUGERS.

The Schedule referred to in these Letters Patent and making part of the same

*To all whom it may concern:*

Be it known that I, IRA T. PAYNE, of Chester, in the county of Middlesex, and State of Connecticut, have invented a new and useful Improvement in Double-Twist Augers and Bits; and I do hereby declare the following to be a full, clear, and exact description of the same.

My invention relates to improvements in augers and bits, and consists in providing those known as "double twist" with a head of increased strength, and the means of securely holding a spur, which is effected by filling up one of the channels of the twist at the head of the tool, as hereinafter set forth.

I construct the twist of my double-twist boring implements from any of the known forms of double-twist plates, and by any of the known methods, and form upon the head a single cutting floor-lip and a screw, as is now commonly used; but in order to give greater strength to the head of the tool, which is most liable to get broken, and also to provide the means for replacing the spur when broken, I make the part of the head which does not receive the chips from the floor-lip, solid, by brazing in a piece or forging.

The accompanying drawing represents a bit constructed according to my invention. One of the channels of the twist is filled up at the head by brazing in a piece, as represented at A.

This piece not only strengthens the head of the lip, but it constitutes the means by which a spur may be held when dovetailed into the bit; but I preferably forge the spur *a* solid with the head, as represented in the drawing.

All the chips are drawn by one of the channels of the twist, and therefore the throat is filled out on one side only, which leaves the screw very strong at the base.

Thus constructed, the floor-lip is little liable to break, or even to spring or "give" when it comes in contact with a knot or other hard substance; the auger bores a straighter, smoother hole, and less force is required to operate it than the ordinary double or even the single twist.

Having thus described my invention,

What I claim as new, and desire to secure by Letters Patent, is—

A double-twist bit or auger having a head made solid on one side, substantially in the manner as herein shown and described, and for the purpose specified.

The above specification signed by me this 7th day of February, 1870.

IRA T. PAYNE.

Witnesses:
SOCRATES DENISON,
J. K. DENISON.